United States Patent
Geirhofer et al.

(10) Patent No.: US 9,755,706 B2
(45) Date of Patent: Sep. 5, 2017

(54) TECHNIQUES FOR JOINT SUPPORT OF COORDINATED MULTIPOINT (COMP) OPERATIONS AND CARRIER AGGREGATION (CA)

(71) Applicant: QUALCOMM Incorporated, San Diego, CA (US)

(72) Inventors: Stefan Geirhofer, San Diego, CA (US); Wanshi Chen, San Diego, CA (US); Hao Xu, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 53 days.

(21) Appl. No.: 13/923,067

(22) Filed: Jun. 20, 2013

(65) Prior Publication Data

US 2013/0343301 A1    Dec. 26, 2013

Related U.S. Application Data

(60) Provisional application No. 61/663,406, filed on Jun. 22, 2012, provisional application No. 61/706,373, filed on Sep. 27, 2012.

(51) Int. Cl.
*H04W 4/00* (2009.01)
*H04B 7/024* (2017.01)
(Continued)

(52) U.S. Cl.
CPC ............ *H04B 7/024* (2013.01); *H04L 5/001* (2013.01); *H04L 5/0035* (2013.01);
(Continued)

(58) Field of Classification Search
CPC ..................................................... H04W 28/04
(Continued)

(56) References Cited

U.S. PATENT DOCUMENTS

| 6,184,589 B1 | 2/2001 | Budnaitis et al. |
| 6,570,250 B1 | 5/2003 | Pommer |

(Continued)

FOREIGN PATENT DOCUMENTS

| CN | 102215582 A | 10/2011 |
| CN | 102255641 A | 11/2011 |

(Continued)

OTHER PUBLICATIONS

CATT., "3GPP TSG RAN WG2 Meeting #66bis," Impact of CoMP on Control Planeu, 3GPP Draft; R2-093727, 3rd Generation Partnership Project (3GPP), Mobile Competence Centre ; 650, Route Des Lucioles, F-06921 Sophia-Antipolis Cedex ; France. no. Los Angeles. USA; Jun. 23, 2009. Jun. 23, 2009 (Jun. 23, 2009). XP050351960, [retrieved on Jun. 23, 2009] sections 2.2, 2.3; figures 2-4.

(Continued)

*Primary Examiner* — Christopher R Crompton
(74) *Attorney, Agent, or Firm* — Patterson & Sheridan, LLP

(57) ABSTRACT

Certain aspects of the present disclosure provide methods and apparatus for joint support of coordinated multipoint (CoMP) operations and carrier aggregation (CA). One method generally includes receiving signaling indicating a configuration, from a set of possible configurations, that defines how the UE is to communicate with one or more base stations (BSs) using coordinated multipoint (CoMP) operations on one or more component carriers (CCs) and communicating in accordance with the configuration.

16 Claims, 15 Drawing Sheets

(51) Int. Cl.
*H04L 5/00* (2006.01)
*H04L 25/02* (2006.01)
*H04L 25/03* (2006.01)

(52) U.S. Cl.
CPC ........ *H04L 5/0057* (2013.01); *H04L 25/0224* (2013.01); *H04L 25/03891* (2013.01)

(58) Field of Classification Search
USPC ......................................................... 370/329
See application file for complete search history.

(56) References Cited

U.S. PATENT DOCUMENTS

| | | | |
|---|---|---|---|
| 6,806,563 | B2 | 10/2004 | Libous et al. |
| 7,586,188 | B2 | 9/2009 | Chang |
| 8,923,905 | B2 | 12/2014 | Montojo et al. |
| 2002/0122461 | A1* | 9/2002 | Hervey et al. ................. 375/132 |
| 2010/0240357 | A1* | 9/2010 | Wu ........................ H04W 24/00 |
| | | | 455/424 |
| 2011/0014922 | A1 | 1/2011 | Jen |
| 2011/0032890 | A1* | 2/2011 | Wu .......................... H04L 5/001 |
| | | | 370/329 |
| 2011/0105043 | A1* | 5/2011 | Wu ........................ H04W 24/10 |
| | | | 455/67.11 |
| 2011/0268028 | A1* | 11/2011 | Stern-Berkowitz ... H04L 5/0048 |
| | | | 370/328 |
| 2012/0039291 | A1 | 2/2012 | Kwon et al. |
| 2013/0003668 | A1* | 1/2013 | Xiao ....................... H04L 5/001 |
| | | | 370/329 |
| 2013/0077521 | A1 | 3/2013 | Feng et al. |
| 2013/0098667 | A1 | 4/2013 | Ryu et al. |
| 2013/0258874 | A1* | 10/2013 | Khoshnevis et al. ......... 370/252 |
| 2013/0279437 | A1* | 10/2013 | Ng et al. ....................... 370/329 |
| 2013/0301548 | A1* | 11/2013 | Etemad ............... H04W 76/048 |
| | | | 370/329 |
| 2013/0310100 | A1* | 11/2013 | Lee et al. ....................... 455/517 |
| 2014/0010126 | A1* | 1/2014 | Sayana ................. H04J 3/1694 |
| | | | 370/280 |

FOREIGN PATENT DOCUMENTS

| | | | |
|---|---|---|---|
| EP | 2375616 | A1 | 10/2011 |
| EP | 2563065 | A1 | 2/2013 |
| EP | 2575278 | * | 4/2013 |
| EP | 2584825 | * | 4/2013 |
| JP | 2015524218 | A | 8/2015 |
| WO | WO-2011041598 | A2 | 4/2011 |
| WO | WO-2011144023 | A1 | 11/2011 |
| WO | WO-2011162522 | A2 | 12/2011 |
| WO | WO2012/022249 | * | 2/2012 |
| WO | WO-2013145552 | A1 | 10/2013 |
| WO | WO-2013189018 | A1 | 12/2013 |

OTHER PUBLICATIONS

International Search Report and Written Opinion—PCT/US2013/046951, International Search Authority—European Patent Office, Oct. 14, 2013.

* cited by examiner

US 9,755,706 B2

TECHNIQUES FOR JOINT SUPPORT OF COORDINATED MULTIPOINT (COMP) OPERATIONS AND CARRIER AGGREGATION (CA)

CROSS-REFERENCE TO RELATED APPLICATION

This application claims benefit of U.S. Provisional Patent Application Ser. No. 61/663,406, filed 22 Jun. 2012, and U.S. Provisional Patent Application Ser. No. 61/706,373 filed 27 Sep. 2012, both of which are expressly incorporated by reference herein in their entirety.

BACKGROUND

Field

The present disclosure relates generally to communication systems, and more particularly, to joint support of CoMP operations and carrier aggregation (CA).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects generally include methods, apparatus, systems, computer program products, and processing systems, as substantially described herein with reference to and as illustrated by the accompanying drawings.

Certain aspects of the present disclosure provide a method for wireless communication by a user equipment (UE). The method generally includes receiving signaling indicating a configuration, from a set of possible configurations, that defines how the UE is to communicate with one or more base stations (BSs) using coordinated multipoint (CoMP) operations on one or more component carriers (CCs), and communicating in accordance with the configuration.

Certain aspects of the present disclosure provide a method for wireless communication by a base station (BS). The method generally includes selecting a configuration, from a set of possible configurations, that defines how a user equipment (UE) is to communicate with one or more base stations (BSs) using coordinated multipoint (CoMP) operations on one or more component carriers (CCs) and signaling an indication of the configuration to the UE.

Certain aspects of the present disclosure provide an apparatus for wireless communication. The UE generally includes means for receiving signaling indicating a configuration, from a set of possible configurations, that defines how a UE is to communicate with one or more base stations (BSs) using coordinated multipoint (CoMP) operations on one or more component carriers (CCs), and means for communicating in accordance with the configuration.

Certain aspects of the present disclosure provide an apparatus for wireless communication. The BS generally includes means for selecting a configuration, from a set of possible configurations, that defines how a user equipment (UE) is to communicate with one or more base stations (BSs) using coordinated multipoint (CoMP) operations on one or more component carriers (CCs), and means for signaling an indication of the configuration to the UE.

Certain aspects of the present disclosure provide an apparatus for wireless communication by a UE. The apparatus generally includes at least one processor and a memory coupled to the at least one processor. The at least one processor is generally configured to receive signaling indicating a configuration, from a set of possible configurations, that defines how the UE is to communicate with one or more base stations (BSs) using coordinated multipoint (CoMP) operations on one or more component carriers (CCs), and to communicate in accordance with the configuration.

Certain aspects of the present disclosure provide an apparatus for wireless communication by a BS. The apparatus generally includes at least one processor and a memory coupled to the at least one processor. The at least one processor is generally configured to select a configuration, from a set of possible configurations, that defines how a user equipment (UE) is to communicate with one or more base stations (BSs) using coordinated multipoint (CoMP) operations on one or more component carriers (CCs) and to signal an indication of the configuration to the UE.

Certain aspects of the present disclosure provide a computer-program product for wireless communication by a UE. The computer-program product generally comprises a non-transitory computer-readable medium having code stored thereon, the code executable by one or more processors for receiving signaling indicating a configuration, from a set of possible configurations, that defines how the UE is to communicate with one or more base stations (BSs) using coordinated multipoint (CoMP) operations on one or more component carriers (CCs) and communicating in accordance with the configuration.

Certain aspects of the present disclosure provide a computer-program product for wireless communication by a BS. The computer-program product generally comprises a non-transitory computer-readable medium having code stored thereon, the code executable by one or more processors for selecting a configuration, from a set of possible configurations, that defines how a user equipment (UE) is to communicate with one or more base stations (BSs) using coordinated multipoint (CoMP) operations on one or more component carriers (CCs) and signaling an indication of the configuration to the UE.

Certain aspects of the present disclosure provide a method for wireless communication by a user equipment (UE). The method generally includes signaling one or more UE capability configurations selected from a first set of possible configurations indicating capabilities supported by the UE for communication with one or more base stations (BSs) using coordinated multipoint (CoMP) operations, receiving signaling, based at least in part on the one or more signaled UE capability configurations, indicating a configuration selected from a second set of possible configurations that defines how the UE is to communicate with the one or more BSs using CoMP operations on one or more component carriers (CCs), and communicating in accordance with the received signaling.

Certain aspects of the present disclosure provide a method for wireless communication by a base station (BS). The method generally includes receiving one or more user equipment (UE) capability signaling configurations from a UE, the signaling configuration selected from a first set of possible configurations indicating capabilities supported by the UE for communication with one or more BSs using coordinated multipoint (CoMP) operations, and transmitting signaling, based at least in part on the one or more signaled UE capability configurations, indicating a configuration selected from a second set of possible configurations that defines how the UE is to communicate with the one or more BSs using CoMP operations on one or more component carriers (CCs).

Certain aspects of the present disclosure provide an apparatus for wireless communication. The UE generally includes means for signaling one or more UE capability configurations selected from a first set of possible configurations indicating capabilities supported by the UE for communication with one or more base stations (BSs) using coordinated multipoint (CoMP) operations, means for receiving signaling, based at least in part on the one or more signaled UE capability configurations, indicating a configuration selected from a second set of possible configurations that defines how the UE is to communicate with the one or more BSs using CoMP operations on one or more component carriers (CCs), and means for communicating in accordance with the received signaling.

Certain aspects of the present disclosure provide an apparatus for wireless communication. The BS generally includes means for receiving one or more user equipment (UE) capability signaling configurations from a UE, the signaling configuration selected from a first set of possible configurations indicating capabilities supported by the UE for communication with one or more BSs using coordinated multipoint (CoMP) operations, and means for transmitting signaling, based at least in part on the one or more signaled UE capability configurations, indicating a configuration selected from a second set of possible configurations that defines how the UE is to communicate with the one or more BSs using CoMP operations on one or more component carriers (CCs).

Certain aspects of the present disclosure provide an apparatus for wireless communication by a UE. The apparatus generally includes at least one processor and a memory coupled to the at least one processor. The at least one processor is generally configured to signal one or more UE capability configurations selected from a first set of possible configurations indicating capabilities supported by the UE for communication with one or more base stations (BSs) using coordinated multipoint (CoMP) operations, receive signaling, based at least in part on the one or more signaled UE capability configurations, indicating a configuration selected from a second set of possible configurations that defines how the UE is to communicate with the one or more BSs using CoMP operations on one or more component carriers (CCs), and communicate in accordance with the received signaling.

Certain aspects of the present disclosure provide an apparatus for wireless communication by a BS. The apparatus generally includes at least one processor and a memory coupled to the at least one processor. The at least one processor is generally configured to receive one or more user equipment (UE) capability signaling configurations from a UE, the signaling configuration selected from a first set of possible configurations indicating capabilities supported by the UE for communication with one or more BSs using coordinated multipoint (CoMP) operations, and transmit signaling, based at least in part on the one or more signaled UE capability configurations, indicating a configuration selected from a second set of possible configurations that defines how the UE is to communicate with the one or more BSs using CoMP operations on one or more component carriers (CCs).

Certain aspects of the present disclosure provide a computer-program product for wireless communication by a UE. The computer-program product generally comprises a non-transitory computer-readable medium having code stored thereon, the code executable by one or more processors for signaling one or more UE capability configurations selected from a first set of possible configurations indicating capabilities supported by the UE for communication with one or more base stations (BSs) using coordinated multipoint (CoMP) operations, receiving signaling, based at least in part on the one or more signaled UE capability configurations, indicating a configuration selected from a second set of possible configurations that defines how the UE is to communicate with the one or more BSs using CoMP operations on one or more component carriers (CCs), and communicating in accordance with the received signaling.

Certain aspects of the present disclosure provide a computer-program product for wireless communication by a BS. The computer-program product generally comprises a non-transitory computer-readable medium having code stored thereon, the code executable by one or more processors for receiving one or more user equipment (UE) capability signaling configurations from a UE, the signaling configuration selected from a first set of possible configurations indicating capabilities supported by the UE for communication with one or more BSs using coordinated multipoint (CoMP) operations, and transmitting signaling, based at least in part on the one or more signaled UE capability configurations, indicating a configuration selected from a second set of possible configurations that defines how the UE is to communicate with the one or more BSs using CoMP operations on one or more component carriers (CCs).

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
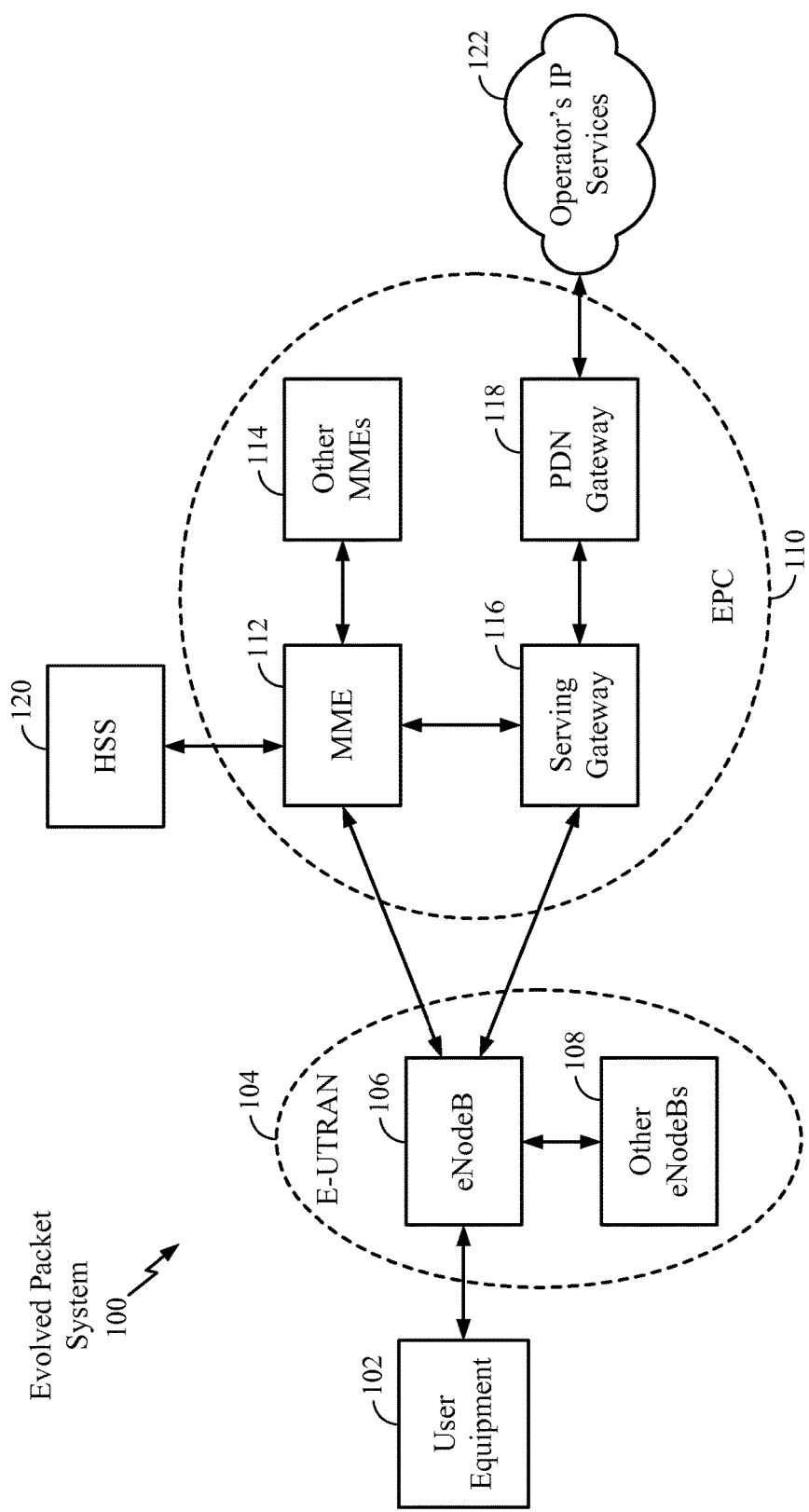
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
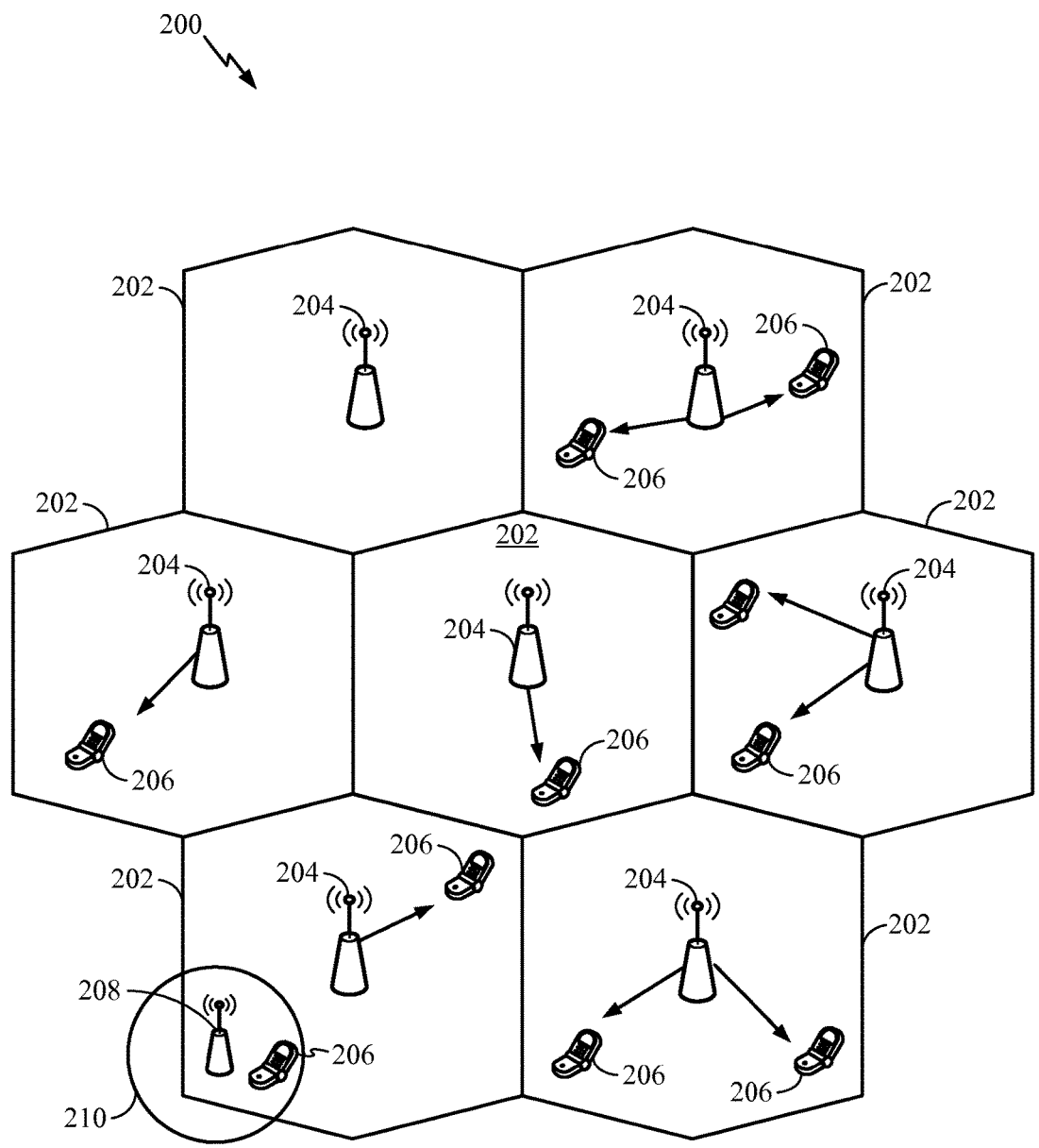
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
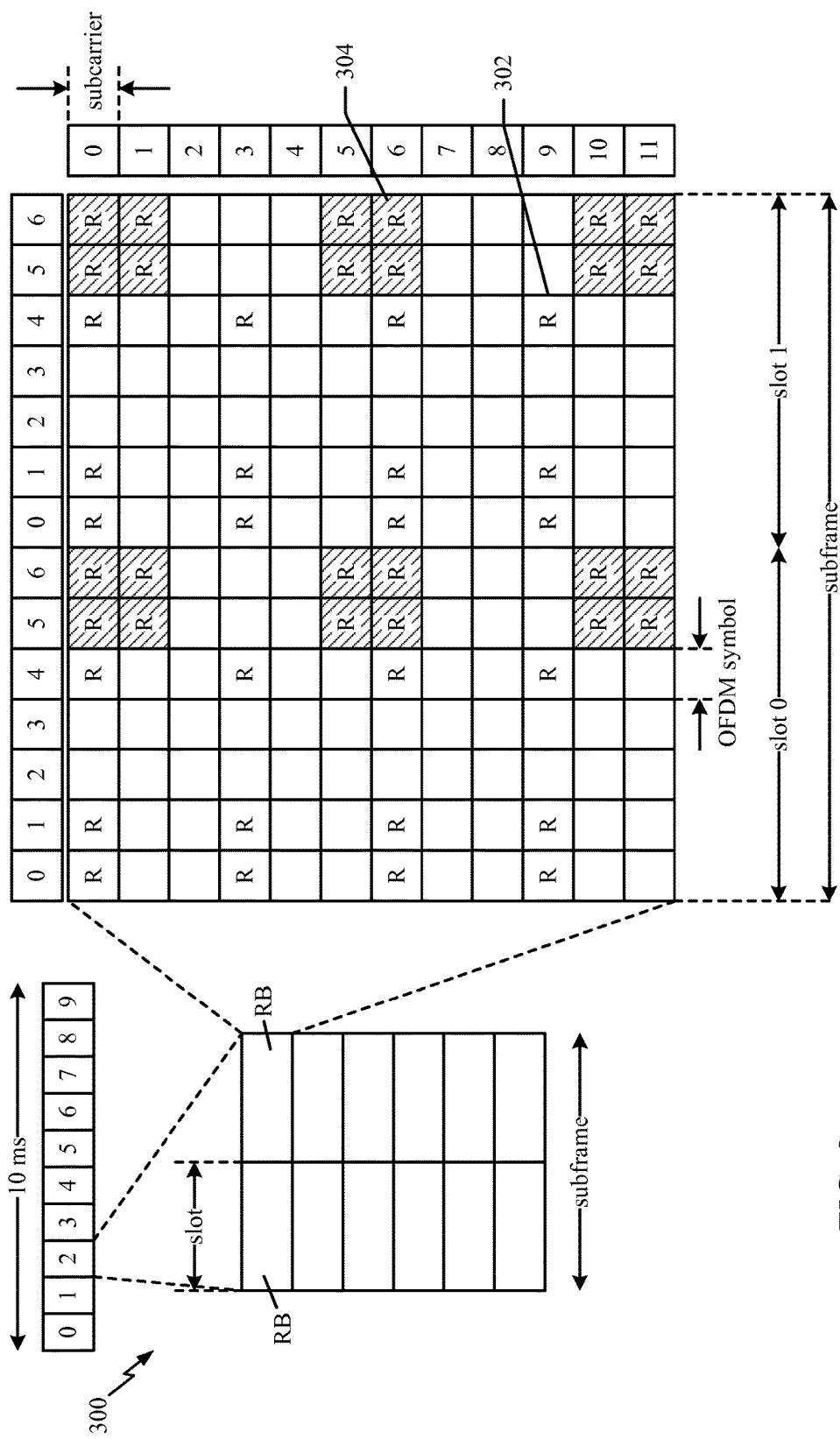
FIG. 3 is a diagram illustrating an example of a frame structure for use in an access network.

FIG. 3 is a diagram 300 illustrating an example of a DL frame structure in LTE. A frame (10 ms) may be divided into 10 equally sized sub-frames. Each subframe may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
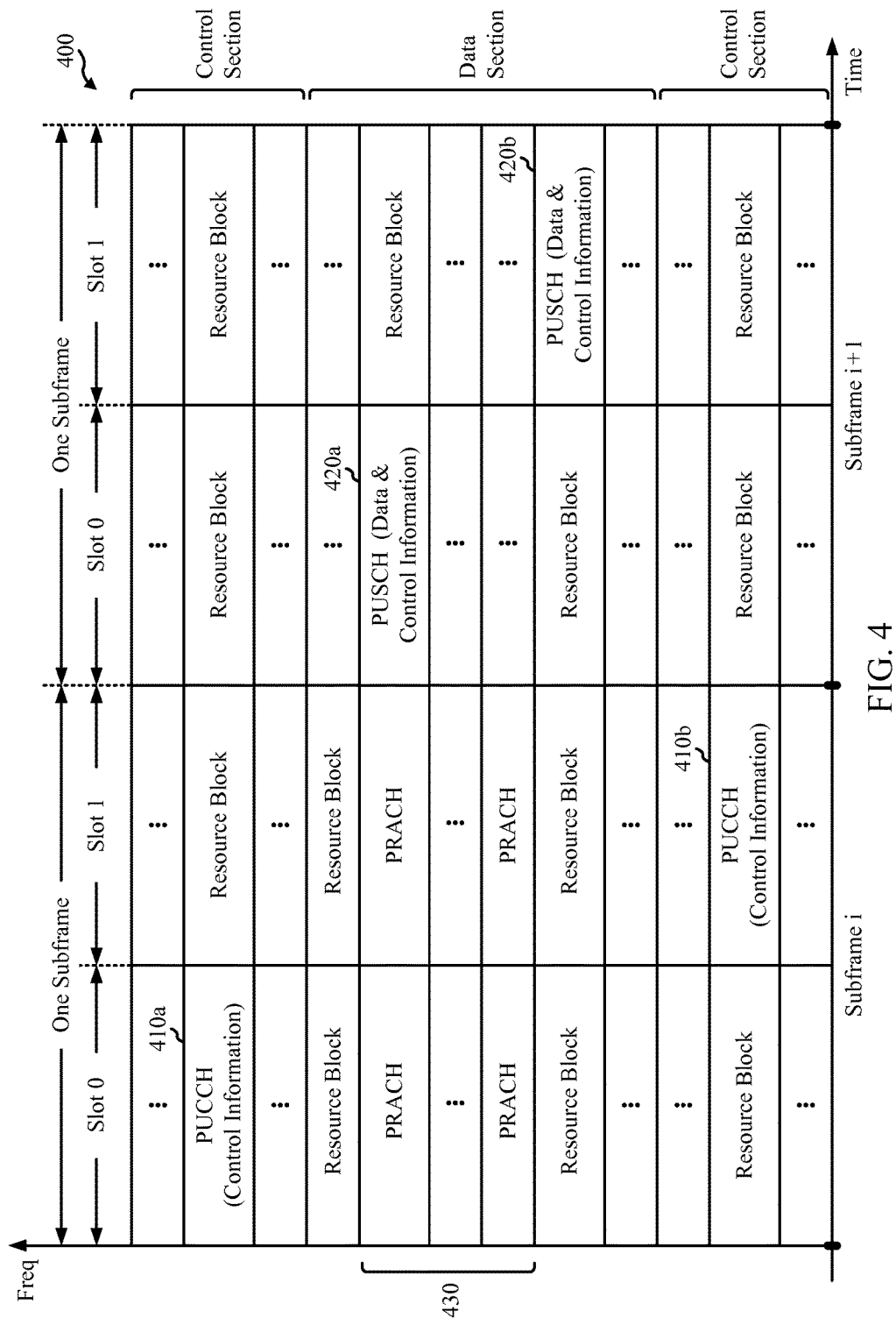
FIG. 4 shows an exemplary format for the UL in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
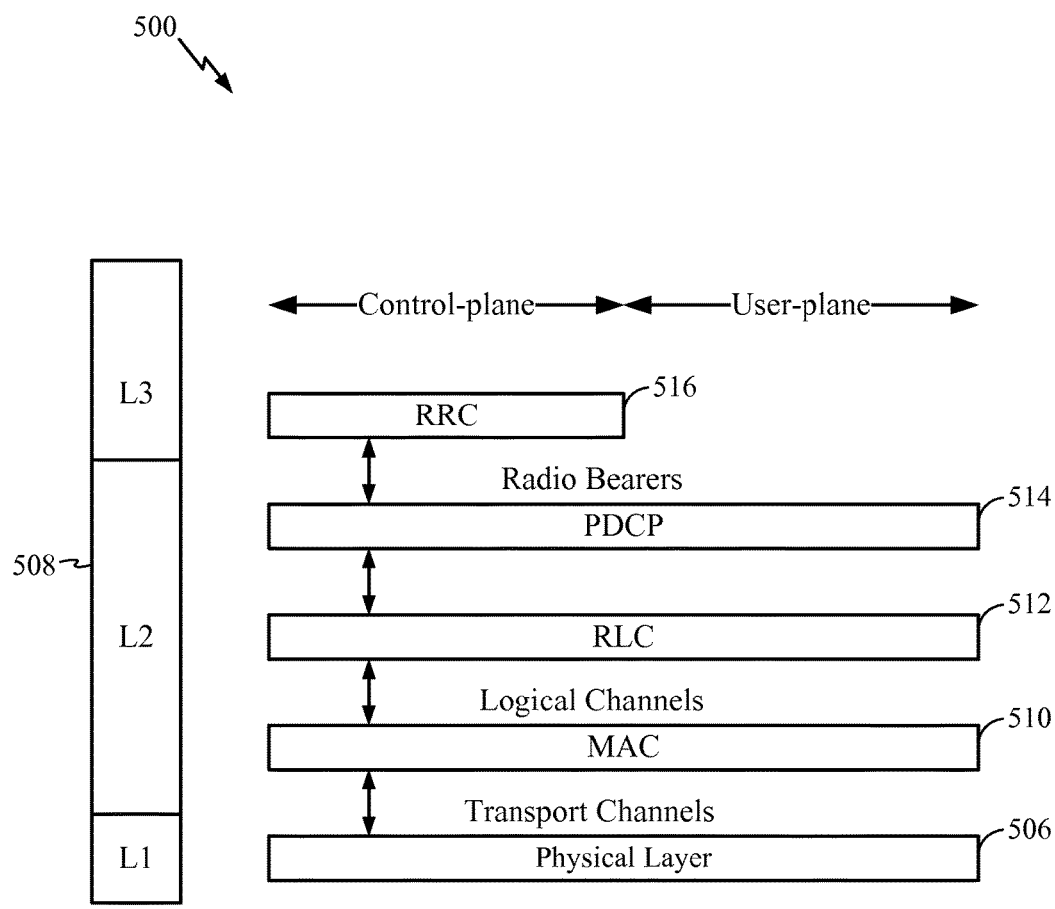
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
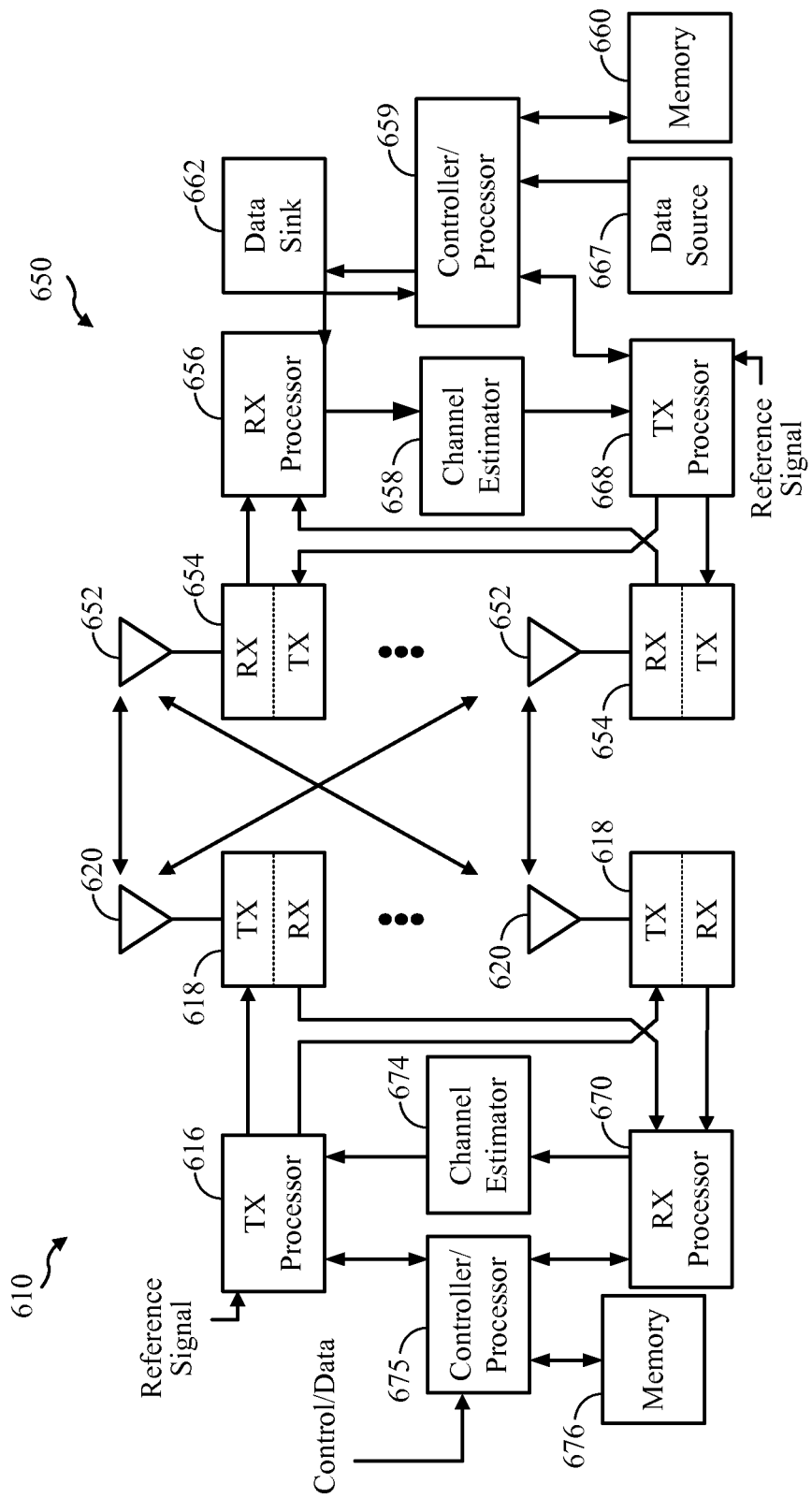
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
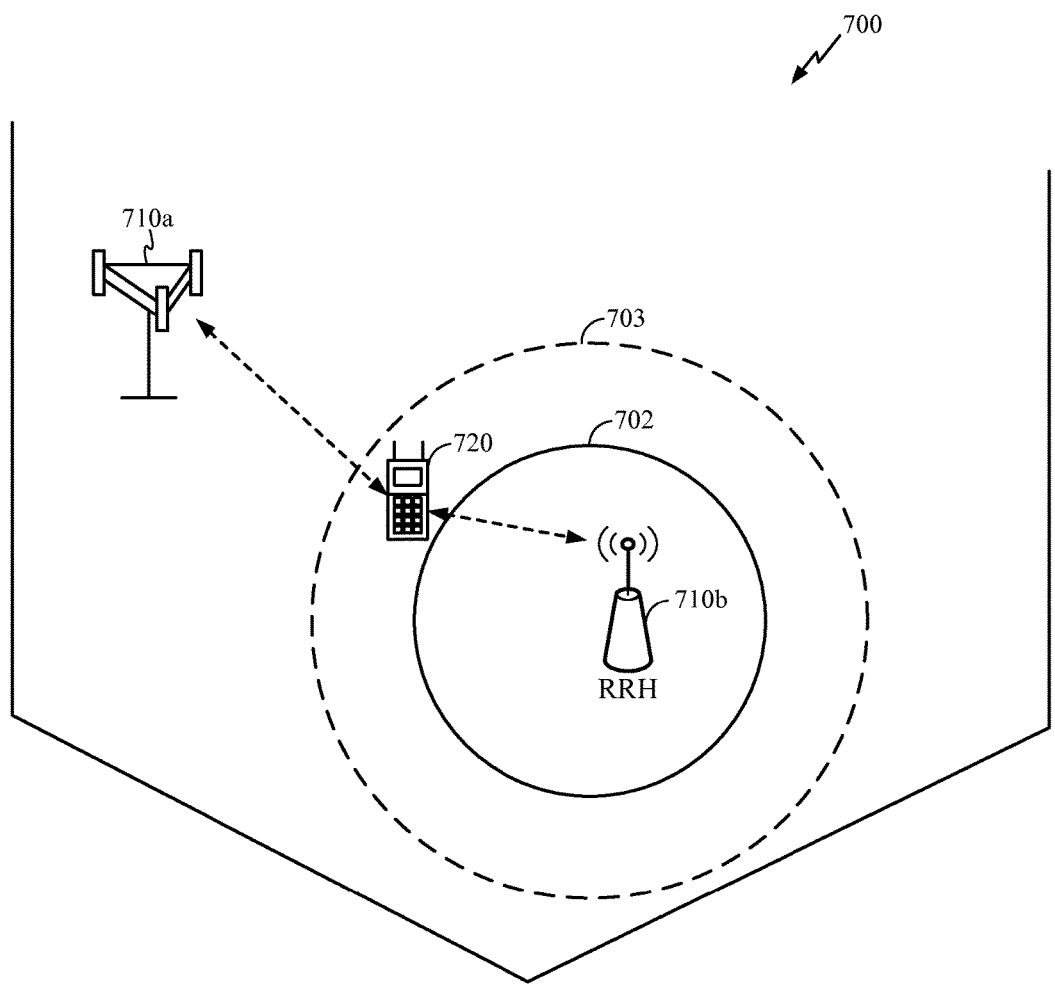
FIG. 7 is a diagram illustrating a range expanded cellular region in a heterogeneous network.

FIG. 7 is a diagram 700 illustrating a range expanded cellular region in a heterogeneous network. A lower power class eNB, such as the RRH 710b, may have a range expanded cellular region 703 that is expanded from the cellular region 702 through enhanced inter-cell interference coordination between the RRH 710b and the macro eNB 710a and through interference cancelation performed by the UE 720. In enhanced inter-cell interference coordination, the RRH 710b receives information from the macro eNB 710a regarding an interference condition of the UE 720. The information allows the RRH 710b to serve the UE 720 in the range expanded cellular region 703 and to accept a handoff of the UE 720 from the macro eNB 710a as the UE 720 enters the range expanded cellular region 703.

Figure 8:
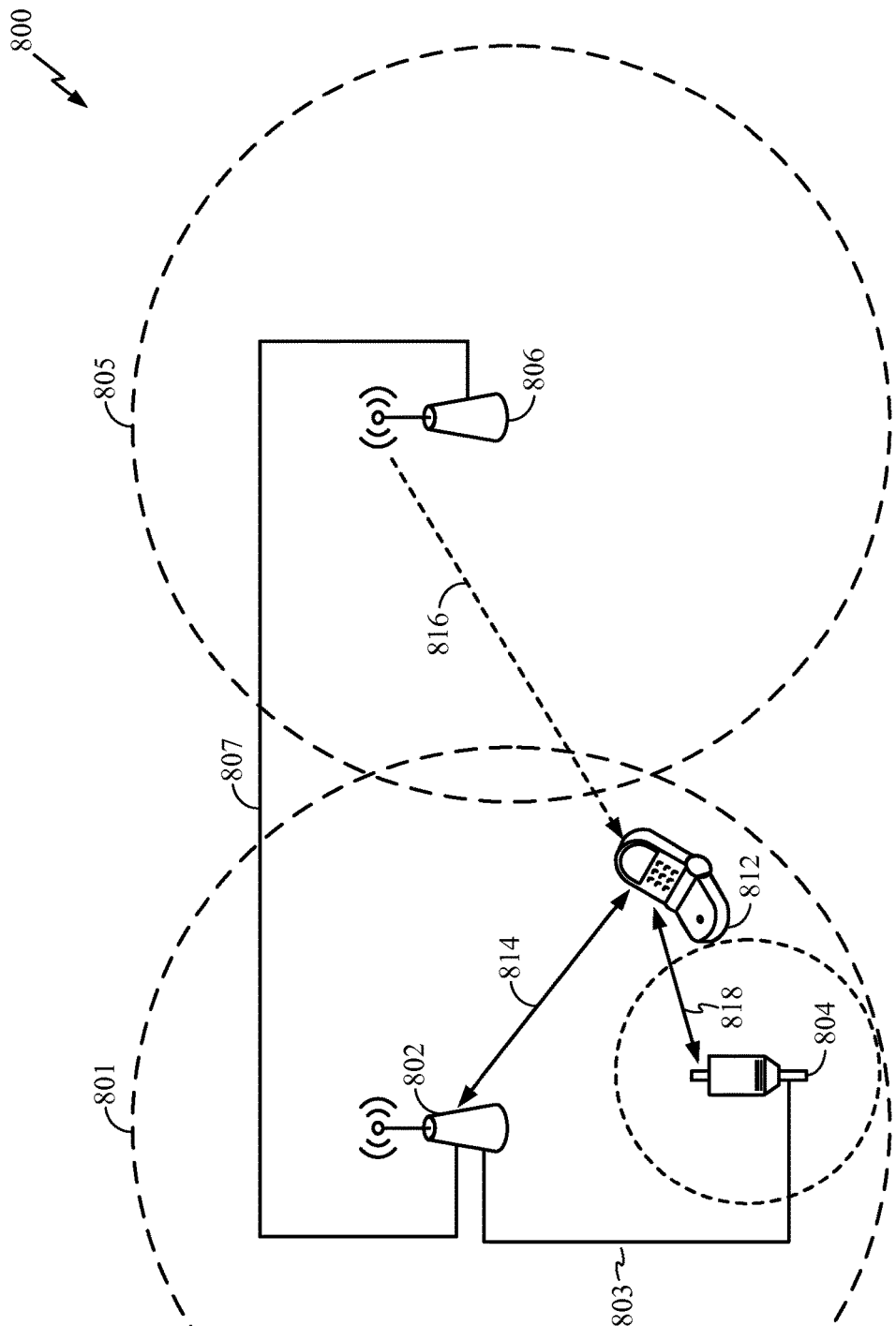
FIG. 8 is a diagram illustrating an example Macro eNB/RRH CoMP configuration in an access network.

FIG. 8 is a diagram illustrating an example Macro eNB and RRH configuration in access network 800. Access network 800 may include multiple clusters 801 of CoMP transmission points. A CoMP cluster 801 may include one or more macro eNBs 802 and one or more RRHs 804. As used herein, the CoMP cluster may be referenced to as heterogeneous where entity 804 operates with reduced transmit power, and the CoMP cluster may be referenced to as homogenous where entity 804 transmits with the same transmit power as another macro eNB. For both homogeneous and heterogeneous deployments, there may be one or more RRHs 804. In one aspect, macro eNB 802 and RRHs 804 may be connected 806 through fiber cable 803, X2 backhaul 807, etc. Generally, UE 812 may receive service from access network 800. In one aspect, a CRS pattern is common across a CoMP cluster 801, e.g., macro eNB 802 and RRHs 804 may transmit using a common CRS pattern. Further, access network 800 may include one or more other CoMP cluster 805 including one or more macro eNB/RRHs 806. In operation, CSI feedback may be obtained to assist UE 812 in communicating with macro eNB 802 and/or RRH 804 including information associated with interference 816 from another CoMP cluster 805.

In one aspect of UE 812, UE 812 may be enabled to use a wireless protocol for communications with the CoMP cluster 801. Such communication protocols may include, but are not limited to, LTE release 8, LTE release 9, LTE release 10, LTE release 11, etc. To provide service to UE 812, channel estimation parameters may be obtained for a channel 814 to potentially be used between UE 812 and macro eNB 802, and/or for a channel 818 between UE 812 and RRH 804, and interference estimation parameters may be obtained to measure interference 816. In one aspect, interference 816 may potentially originate from other RRHs 804, macro eNB 802, and/or other CoMP clusters 805. Various schemes for configuring resource element patterns for various resource pattern groups (e.g., CoMP clusters) to allow a UE perform channel estimation and interference estimation are now presented.

Figure 9:
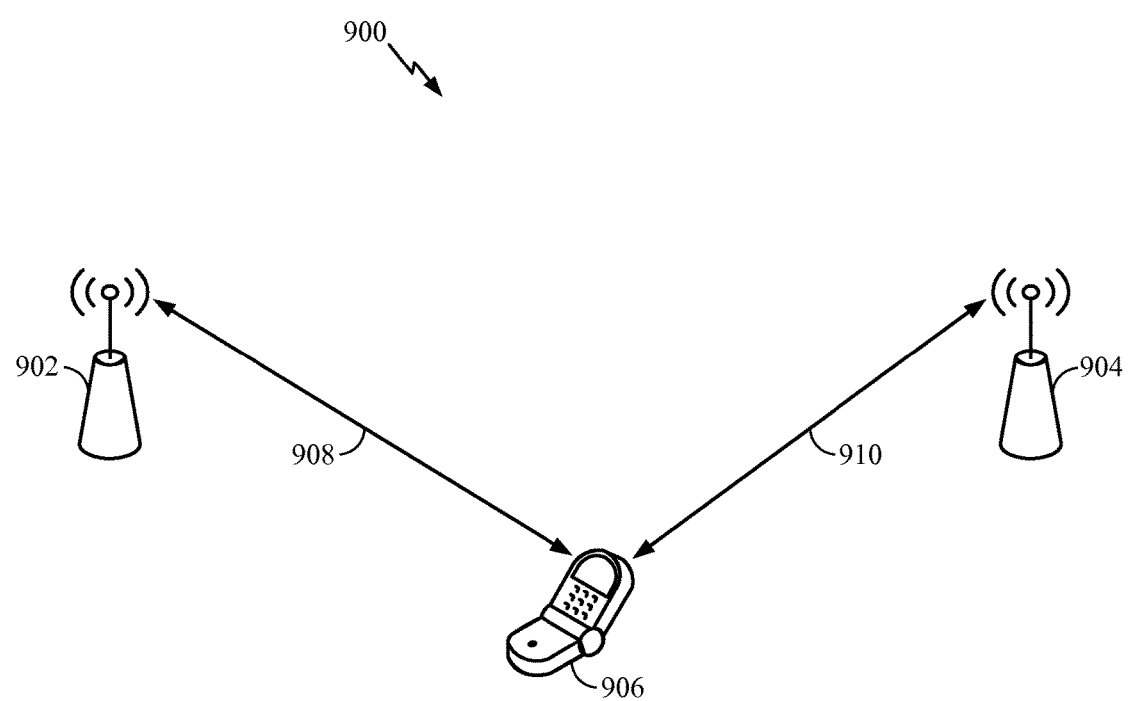
FIG. 9 is a diagram illustrating another example Macro eNB/RRH CoMP configuration in an access network.

FIG. 9 is a diagram illustrating an example access network 900 in which UE 906 may perform channel state measurements associated with multiple possible serving transmission points (902, 904). In one aspect, transmission points (902, 904) may be coordinated to operate as a CoMP cluster. Access network 900 may include support for multiple CoMP schemes including coordinated scheduling and/or coordinated beamforming, dynamic point selection (DPS), coherent and/or non-coherent joint transmission (JT), etc.

Further, access network 900 may provide support for homogeneous and/or heterogeneous CoMP cluster operations. According to a first homogenous scenario, CoMP may be supported across cells of the same macro site. According to a second homogenous scenario, CoMP may be supported across three neighboring macro site. According to a first heterogeneous scenario, CoMP may be supported across a macro cell and its picos (RRHs). Macro/RRHs may be configured with different cell IDs. According to a second heterogeneous scenario, CoMP may be supported across a macro cell and its picos (RRHs), wherein macro/RRHs may be configured with the same cell ID. Accordingly, benefits may exist in reducing the dependency of physical cell IDs.

In one aspect, CSI feedback reporting encompasses channel and interference measurement both of which may be facilitated through a combination of reference signals, including one or more Channel State Information Reference Signals (CSI-RS) and one or more Common Reference Signal (CRS). As used herein, a CSI-RS may be differentiated into non-zero power (NZP) and zero-power (ZP) CSI-RS. The non-zero power CSI-RS may include actual pilot transmissions with non-zero power that may be received by a UE 906 and used to measure channel and/or interference conditions. The zero-power CSI-RS, on the other hand, may represent one or more muted resource elements. Such muting may be used for interference measurement. The configuration of both zero-power and non-zero power CSI-RS resources may be UE 906 specific. Further, for a specific UE 906, multiple non-zero power CSI-RS resources and zero-power CSI-RS resources may be defined.

The CoMP schemes include CSI feedback reporting which may include multiple candidate transmission points for DPS. For coherent and/or non-coherent JT multiple transmission points (e.g., 902, 904) may contemporaneously transmit to the UE. CSI feedback reporting may be performed aperiodically and/or periodically. Aperiodic feedback may be performed on a per-request basis. Such aperiodic feedback may be triggered in access network 900 through a grant on PDCCH. Aperiodic CSI feedback reporting may be transmitted by UE 906 using an uplink data transmission (e.g., on PUSCH), thereby allowing for larger payload transmissions than would be available on the uplink control channel (e.g., PUCCH). Periodic feedback may include one or more reporting modes, and may follow a specific semi-statically configured timeline. Periodic CSI feedback reporting may be transmitted by UE 906 using the PUCCH, which allows for a more limited payload compared to the payload available for aperiodic feedback.

A UE may send multiple CSI feedback reports that are computed based on different sets of reference signal resources. Each CSI feedback report may include channel measurement, interference measurement, or any combination thereof. Feedback reporting using different sets of reference signal resources is useful as these reference signals may be indicative of different candidate transmission alternatives from which the network may select. For example, in one aspect, the UE 906 may be served either by transmission point 902 or by transmission point 904 as part of a DPS scheme. In such an aspect, UE 906 may be configured to perform measurements associated with two separate non-zero power CSI-RS resources for channel measurement. Further, UE 906 may report two sets of CSI reports, each indicative for one of the serving alternatives. Similar to the above channel measurement options, the UE 906 may perform various interference measurements for the purpose of CSI feedback reporting (e.g., which zero-power CSI-RS resources to use when performing interference measurements).

Signaling for CSI measurement and reporting configurations may include use of one or more resource pattern groups. Multiple groups of reference signal patterns may be used and these groups may constitute separate feedback reporting instances for which CSI feedback is reported. CSI reports for different groups may be indicative of different configurations of channel and/or interference measurement. As such, CSI reports for different groups may differ substantially. For each resource pattern group, a first and a second resource element pattern may be considered. The first resource element pattern may be used for channel measurement and may use one or more non-zero power CSI-RS resources. In an optional aspect, usage of a CRS pattern may also be considered. The second resource element pattern may be used for interference measurement and may include zero-power CSI-RS resources and/or CRS. Non-zero power CSI-RS resources may also be used for interference measurement, e.g., after subtracting the known pilot transmissions. The UE 906 may be informed of which CSI-RS resources to use through either explicit or implicit signaling, or a combination thereof. The first resource element pattern of different resource pattern groups may or may not correspond to the same CSI-RS resources. Similarly, the second resource element pattern of different resource pattern groups may or may not correspond to the same CSI-RS resources. For example, in one aspect, two resource pattern groups may be considered where both groups may have first resource element patterns that correspond to the same CSI-RS resources used for channel measurement while the groups may have different configurations for the second resource element pattern used for interference measurement.

Where explicit signaling is used, the UE 906 may be signaled through a new field which CSI-RS resource(s) should be used. Further, where explicit (e.g., dedicated) signaling is used, interference measurement resources may be signaled separately from the channel measurement resources through a combination of RRC and/or dynamic signaling. In one aspect, dynamic signaling may complement RRC signaling. For example, a total of four resources may be configured in RRC signaling, and dynamically signaling may include 2 bits; the 2 bits may indicate which of the RRC signaled resources the UE 906 should measure.

Where implicit signaling is used, the UE 906 may infer the one or more CSI-RS resources to use from the subframe in which the report is requested. The UE 906 may then combine the channel and interference measurements (908, 910) associated with each of the multiple transmission points (902, 904) into a single CSI report for each transmission point (902, 904) that is conveyed to the network.

For aperiodic feedback, the index of the one or more configured CSI-RS resources may be signaled using dynamically signaling. In one aspect, a combination of RRC and dynamic signaling can be used to configure which channel/interference resource the UE 906 should measure. As discussed supra, multiple groups of reference signal resources may be configured to enable CSI reporting indicative of different transmission alternatives. Each of these groups may include different channel and/or interference measurement resource patterns. Aperiodic reporting may include CSI computed based on different resource patterns for interference measurement. For example, even if a single reference signal pattern is configured for channel measurement, multiple CSI-RS resources may be configured for interference estimation in a reference subframe. UE 906 may generate separate aperiodic CSI feedback reports using these different resource patterns for interference measurement. Furthermore, where multiple resource pattern groups are measured, additional signaling may be used to convey to the UE 906 whether to compute rank indication, precoding matrix, and channel quality (RI/PMI/CQI) for each group or whether to report a subset of RI/PMI/CQI in certain CSI feedback reports. For example, UE 906 may report all of RI/PMI/CQI for one group, but only CQI for another group.

In one aspect, the encoding of the CSI reports corresponding to different groups may be performed jointly to reduce feedback payload. For example, additional CQI reporting may be encoded as an offset (delta CQI) compared to an absolute CQI value in another report. In another aspect, additional CQI may be reported on a wideband and/or per-subband basis. In another aspect, for aperiodic reporting, the reference resource may be defined based on the subframe in which the request for the aperiodic CSI reports was received. An additional offset may apply be applied to capture processing delays. For example, based on the subframe in which the request for an aperiodic CSI report is received, a reference resource subframe may be determined. This determination may also depend on other parameters such as but not limited to what type of grant has triggered the aperiodic feedback request. In line with the reference signal resource patterns that fall into the reference subframe, one or more CSI feedback reports may be sent by the UE. In one aspect, a UE may be subject to an upper limit on how many resource patterns may be reported. In such an aspect, this upper limit may be configured through RRC signaling.

For periodic feedback, the one or more CSI-RS resources may be signaled as part of a reporting mode configuration. In one aspect, periodic feedback may report different channel/interference measurement configurations in separate reporting instances. In such an aspect, configuration of CSI-RS resources for channel/interference measurement can be made part of a semi-static configuration of the reporting mode. In another aspect, the UE 906 may determine, at least partially, what reference signal pattern groups to report in a certain periodic feedback reporting instance. In such an aspect, the UE 906 may report only the best (with respect to channel state information) reference signal pattern group at a time. The UE 906 may indicate as part of the report which reference signal pattern group was reported. In another aspect, the UE may cycle across several combinations in a pattern that is part of the feedback reporting configuration.

Figure 10:
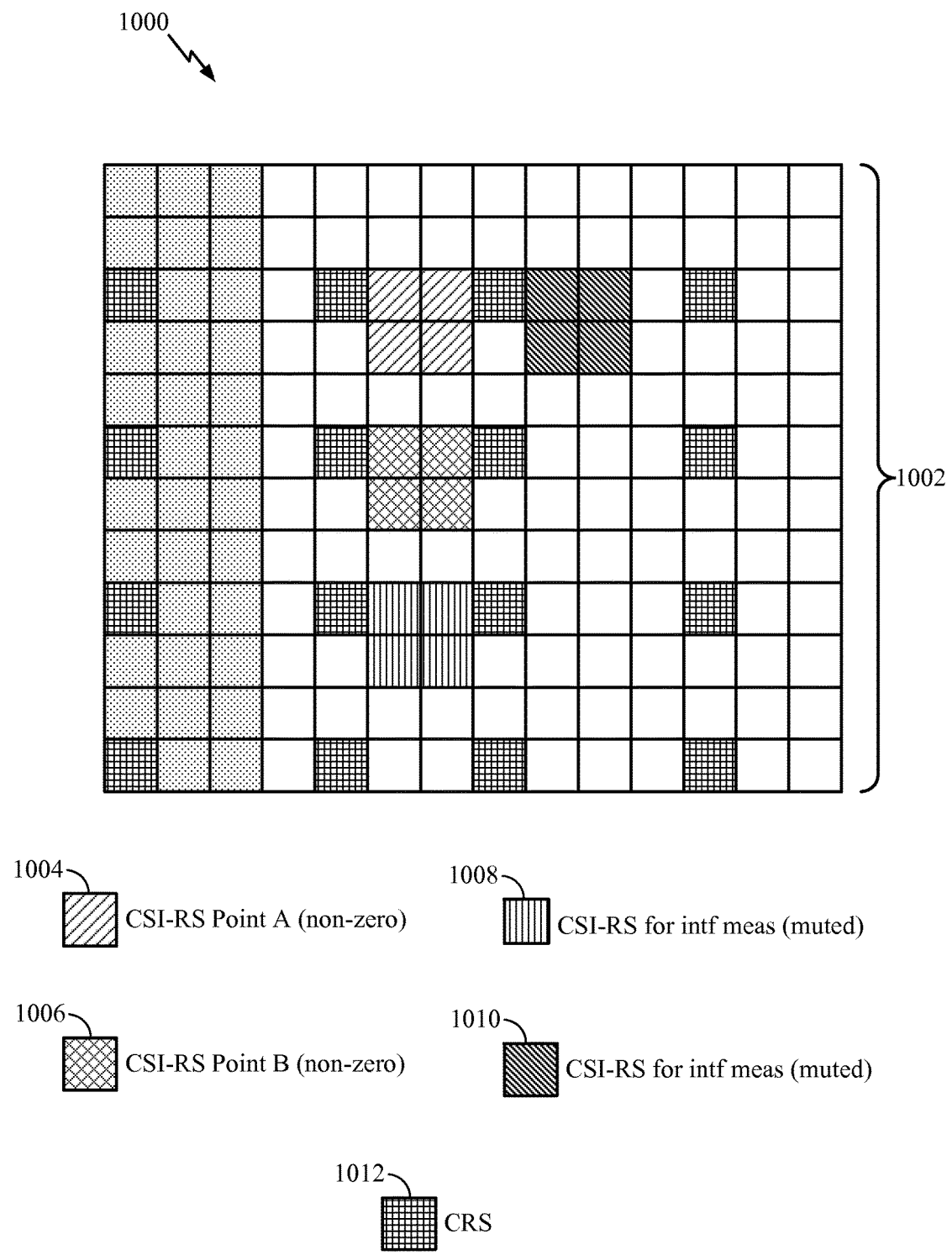
FIG. 10 is a diagram illustrating an example frame structure and resource element configuration to enable CSI measurements according to an aspect.
Figure 11:
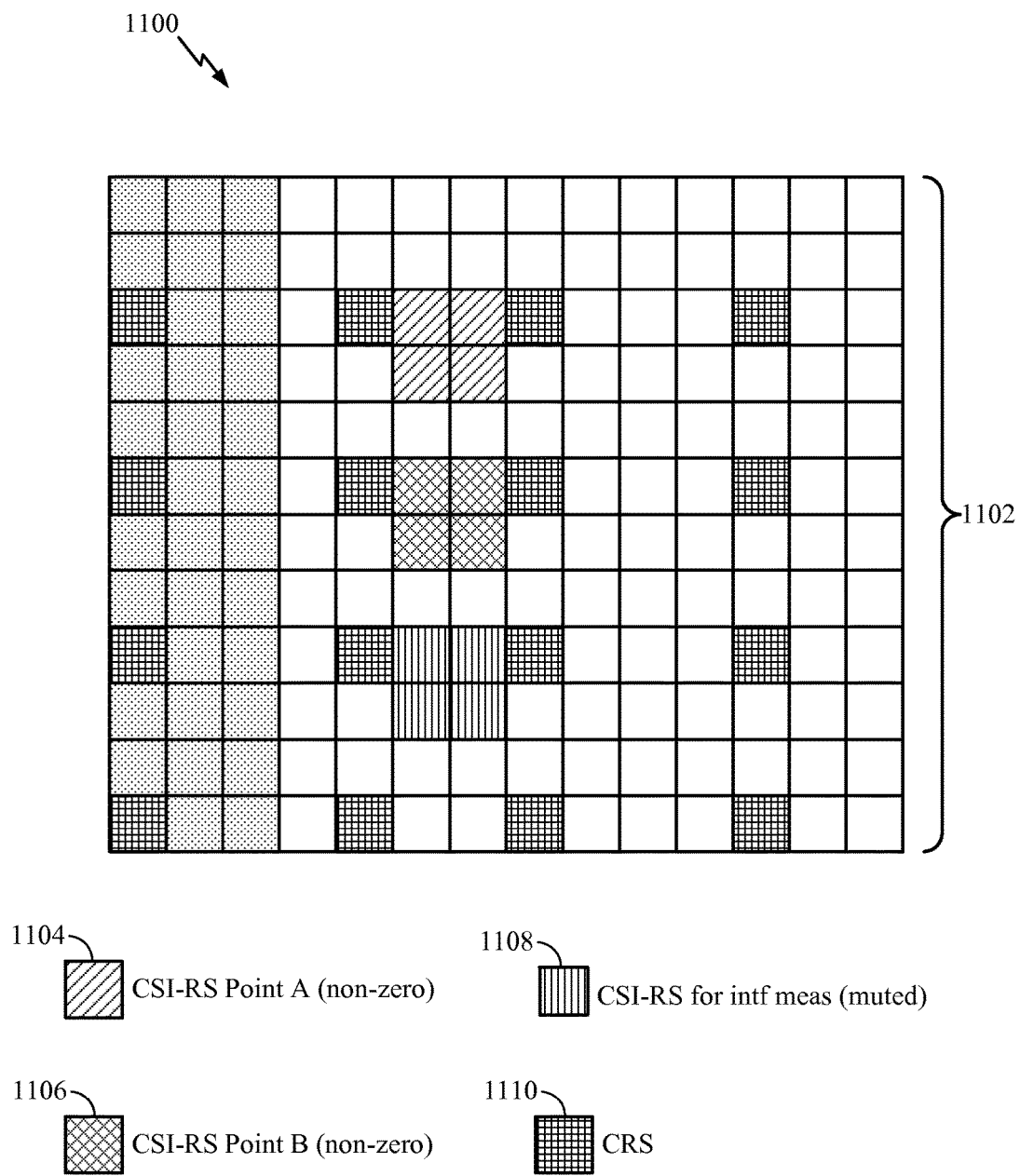
FIG. 11 is a diagram illustrating another example frame structure and resource element configuration to enable CSI measurements according to an aspect.

FIGS. 10 and 11 provide example CoMP schemes for CSI feedback reporting.

FIG. 10 is a diagram illustrating an example frame structure 1000 and resource element configuration 1002 to enable CSI measurements. Resource element configuration 1002 may include one or more resource elements 1004 allocated for channel estimation associated with a first transmission point (e.g., transmission point 902), one or more resources elements 1006 allocated for channel estimation associated with a second transmission point (e.g., transmission point 904), one or more resources elements 1008 allocated for interference estimation associated with a first transmission point (e.g., transmission point 902), one or more resources elements 1010 allocated for interference estimation associated with a second transmission point (e.g., transmission point 904), and one or more resources elements 1012 for a common reference signal (CRS).

Where CSI-RS resource configuration information is communicated through an implicit configuration, a linkage of channel and interference measurement resources implies that the interference measurement resources (1008, 1010) may be derived from the channel measurement resources (1004, 1006) configuration. In one aspect, implicit configuration may include mapping of channel and interference resources using a one-to-one mapping. In such an aspect, for any non-zero power CSI-RS resource for channel estimation (1004, 1006), there may be a dedicated interference measurement CSI-RS resource (1008, 1010). An interference measurement resource may be zero-power (e.g., muted) and/or non-zero power (e.g., not muted). Where the interference measurement resource is non-zero power, the UE (e.g., UE 906) may subtract one or more known pilot signals and use the resource elements for interference estimation. In such an aspect, separate signaling may include pilot information, pre-coding information, etc.

In another aspect, implicit configuration may include mapping of channel and interference resources using a one-to-many mapping. In such an aspect, multiple muted CSI-RS resources may be assigned for interference estimation without introducing ambiguity. In other words, a mapping from each channel estimation measurement resource (1004) to the set of interference measurement resources (1008, 1010) could be a direct mapping. Further, non-zero power CSI-RS resources (1004, 1006) may be used to supplement interference estimation by subtracting one or more known pilots from resource elements initially allocated to channel estimation and reusing the resource elements for interference estimation. In one aspect, mapping between channel and interference measurements resource elements may be different depending on a subframe, subframe set and/or subframe type.

As depicted in FIG. 10, feedback associated with a first transmission point (e.g., transmission point 902) may be obtained using resource element pattern 1004 for channel estimation and resource element pattern 1008 for interference estimation. Further, feedback associated with a second transmission point (e.g., transmission point 904) may be obtained using resource element pattern 1006 for channel estimation and resource element pattern 1010 for interference estimation. In one aspect, CRS 1012 may be used in combination with CSI-RS for interference estimation.

One of ordinary skill in the art would appreciate that although the above discuss refers to resource element patterns corresponding to individual transmission points, the disclosure also covers one or more other configurations. For example, the resource elements 1004, 1006 may not necessarily correspond a first transmission point and second transmission point, respectively. Rather, in one aspect, a single resource element pattern 1004 may span more than a single transmission point. Further, the specific mapping of CSI-RS ports to transmission points may be transparent to the UE.

FIG. 11 is a diagram illustrating an example frame structure 1100 and resource element configuration 1102 to enable CSI measurements. Resource element configuration 1102 may include one or more resources elements 1104 allocated for channel estimation associated with a first transmission point (e.g., transmission point 902), one or more resources elements 1106 allocated for channel estimation associated with a second transmission point (e.g., transmission point 904), one or more resources elements 1108 allocated for interference estimation to be shared among multiple transmission points (e.g., transmission point 902, 904), and one or more resources elements 1110 for a common reference signal (CRS).

Interference measurement resources 1108 sharing among multiple channel measurement resources allows for reduced system overhead. In an aspect in which two transmission points (e.g., 902, 904) are neighboring points, the interference measured on 1108 may include interference from points other than these two. However, in such as case, if the feedback report for either transmission point is computed using the shared interference measurement resource 1108, interference from the other transmission point may not be measured as part of the report. This deficiency may be undesirable from a network perspective, as multiple transmission points may be active and may generate interference (e.g., one transmission point 902 may serve UE 906 while the other transmission point 904 may serve a different UE and may result in interference to UE 906). To avoid unaccounted for interference, interference from one or more other transmission points (e.g., 904) may be incorporated based on channel measurement resource patterns associated with each of the other transmission points by adding the one or more channel measurements to the interference measurement obtained from the dedicated interference measurement resource. When adding interference based on the channel measurement resource of the other transmission point, a pre-coder assumption may need to be made as the pilot present on the channel measurement resource may differ from the pre-coder that may eventually be assigned by the network. In one aspect, signaling could be added to inform the UE (e.g., 906) what pre-coder assumption to use. For example, interference may be added using a full-rank (or hard-coded) pre-coder assumption, etc. In another aspect, each transmission point may offset the received CSI report based on scheduling decisions.

The above technique of "adding-back" interference may be applied in the cases other than where CSI-RS resources for interference estimation are shared among multiple transmission points. The method could be performed based on any non-zero power CSI-RS resource by indicating that the non-zero power CSI-RS represents an interference contribution and adding it to the interference estimate obtained from the dedicated interference measurement resources. The configuration of this procedure may be signaled explicitly through a combination of RRC and/or dynamic signaling. The implicit configuration options discussed above may be applied as well.

In another aspect, configuring separate resources for each of the two channel measurement resources may not be needed, and instead common resources may be used and add interference for reporting purposes may be based on the channel measurement resource of the other transmission point.

Techniques for Joint Support of CoMP Operations and CA

Carrier aggregation (CA) may enable increased peak rates and possibly interference coordination on a per component carrier (CC) basis. The possibility to support interference coordination depends on the type of deployment in which CA may be used. CoMP targets tight interference coordination (possibly based on centralized processing) for co-channel deployments.

Joint operations of CoMP and CA may offer flexibility. However, CoMP+CA may lead to increased UE complexity. Individually, CoMP and CA already increase UE complexity (for example, increased UE complexity in terms of CSI feedback complexity). CA supports up to 5 CCs in Rel-10. Therefore, a UE may need to support up to 5 times the CSI feedback load as compared to non-CA.

CoMP may support a similar increase in terms of configurable CoMP CSI reporting configurations. Accordingly, aspects of the present disclosure introduce limits so as to flexibly configure joint operations of CoMP and CA.

Figure 12:
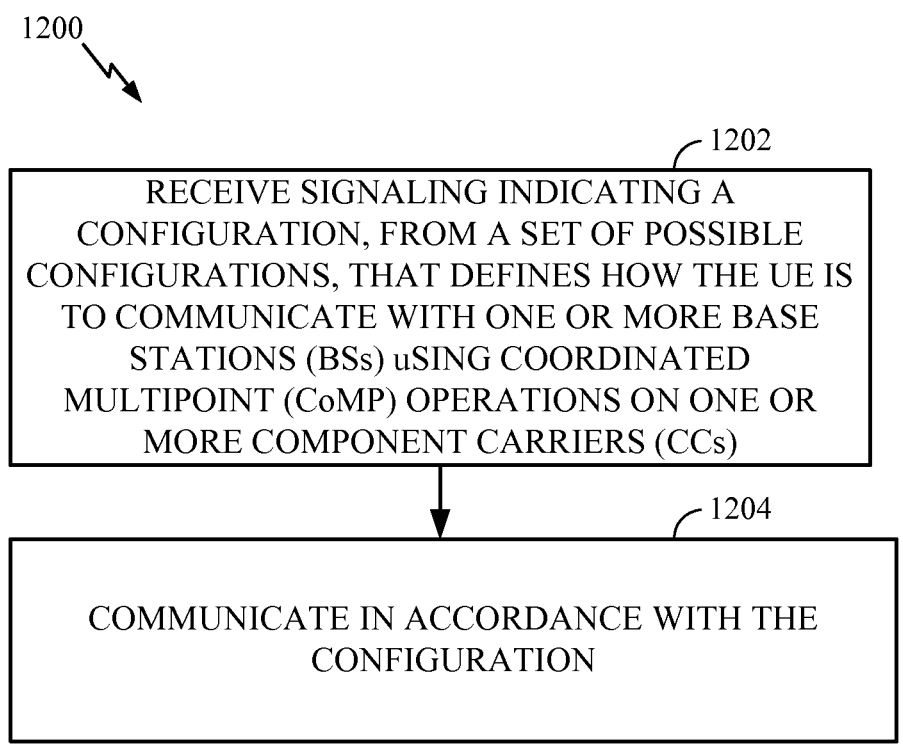
FIG. 12 illustrates example operations that may be performed, for example, by a UE, in accordance with certain aspects of the present disclosure.

As will be described in more detail herein, FIG. 12 illustrates example operations 1200 that may be performed, for example, by a UE (for example, UE 650), in accordance with certain aspects of the present disclosure. At 1202, the UE may receive signaling indicating a configuration, from a set of possible configurations, that defines how the UE is to communicate with one or more BSs using CoMP operations on one or more component carriers (CCs). At 1204, the UE may communicate in accordance with the configuration.

Figure 13:
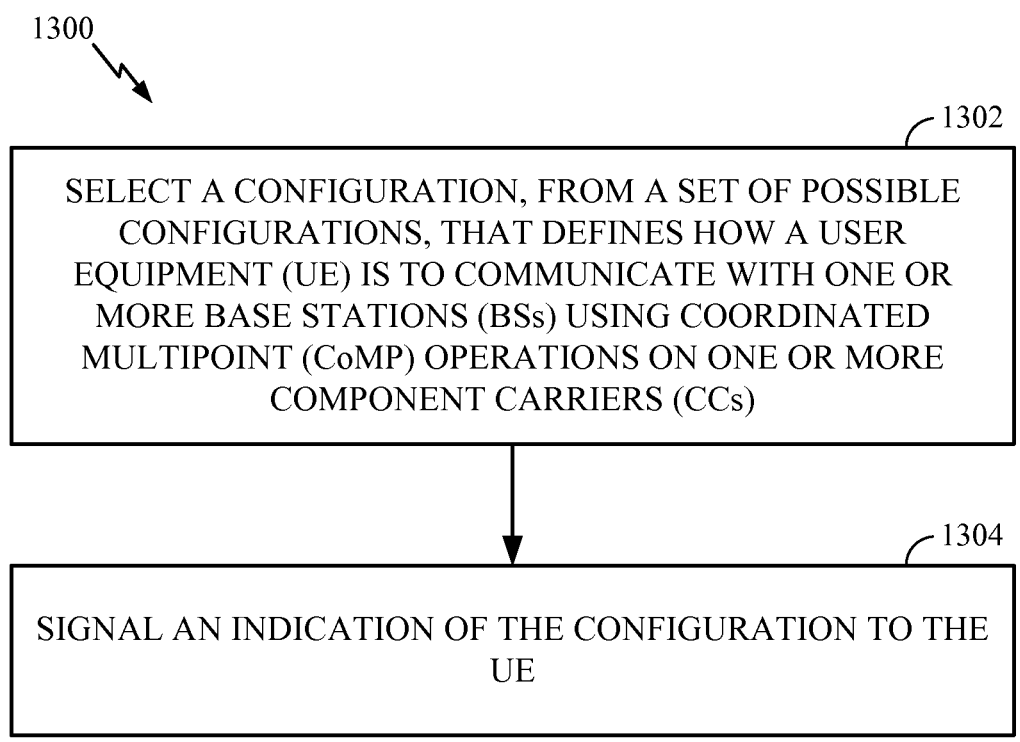
FIG. 13 illustrates example operations that may be performed, for example, by a BS, such as a node participating with other nodes in CoMP operations with a UE, in accordance with certain aspects of the present disclosure.

FIG. 13 illustrates example operations 1300 that may be performed, for example, by a base station (for example, BS 610), such as a node participating with other nodes in CoMP operations with a UE, in accordance with certain aspects of the present disclosure. At 1302, the BS may select a configuration, from a set of possible configurations, that defines how a UE is to communicate with one or more BSs using CoMP operations on one or more CCs. At 1304, the BS may signal an indication of the configuration to the UE.

Configuration Options for CoMP+CA

According to a First Alternative, CoMP may be supported on more than one CC. This may offer full flexibility, since CoMP may be supported on all CCs. Even though CoMP may be supported on all CCs, restrictions may be necessary in an effort to limit the number of CSI processes that may be configured.

According to a Second Alternative, CoMP may be supported on a single CC. It may be configurable whether that single CC is the primary component carrier (PCC) or a secondary component carrier (SCC). Supporting CoMP on a single CC may be an attractive option as initial network deployments may only support CoMP on a single carrier. Such configurability may allow multiple use cases. Additionally, supporting CoMP only on a single CC may be beneficial from a complexity viewpoint. However, similar to the First Alternative where CoMP is supported on more than one CC, further restrictions may be needed.

Supporting CoMP on a PCC may allow improved mobility handling, for example, in a heterogeneous deployment scenario where macro/RRHs may be configured with the same cell ID. Supporting CoMP on a SCC may be motivated by configuration of CoMP on a CC of a new carrier type (NCT). For example, such NCT may not require CRS rate matching for some CoMP schemes, such as joint transmission.

According to a Third Alternative, only one of CoMP or CA may be configured. This alternative may limit UE complexity at the expense of some configuration flexibility.

In combination with general configurability of CoMP and CA, restrictions may need to be placed on the number of configurable CSI reports the UE may support. Referring to the First Alternative where CoMP may be configured on more than one CC, the number of configurable CSI reports may be limited per CC. For example, per-CC, the number of configurable CSI reports for CoMP may be limited by a certain number $N_1$, where $N_1$ may depend on the total number of configured CCs to limit overall UE complexity.

Referring to the First Alternative, according to aspects, only the overall number of configurable CSI processes may be limited. For example, the total number of CoMP feedback reporting configurations may be restricted to be no greater than a certain number $N_2$. The number of configured CCs $N_{CC}$ may also be taken into account. For example, the number of CoMP feedback reporting configurations may be limited to $N_2-N_{CC}$, in an effort to limit the overall number of CSI processes that a UE may need to generate.

Referring to the Second Alternative described above where CoMP may be configured on a single CC, the overall number of configurable CSI processes may be limited for the one CC that may be configured with CoMP. This limitation may depend on the total number of configured CCs.

CCs configured as NCT may be configured with CoMP IMR for interference measurement. On NCTs, CRS may not be present in every subframe. Therefore, interference measurement may not be possible based on CRS in NCTs. The Second Alternative, as previously defined, may limit the number of NCT CCs to a single carrier (e.g., since, as described above, in the Second Alternative, CoMP may be configured on at most one CC). The Third Alternative, as previously defined, may be in conflict with supporting NCT operation.

In an effort to support multiple NCT CCs in the Second and Third Alternative, while attempting to keep the benefits of reduced UE complexity, the CoMP configuration on NCT CCs may be further restricted. For example, CoMP may be allowed on NCT CC, but CoMP operations on such CCs may be restricted. According to aspects, CoMP operations may be restricted by allowing only a single NZP-CSI-RS resource for channel measurement (i.e., CoMP measurement set size 1). According to aspects, only a single IMR configuration may be allowed for interference measurement. Thus, there may be only one possible CSI reporting configuration, which is similar in complexity to the single CSI process that would be needed for carrier aggregation on that CC.

For the Second Alternative, CoMP may be allowed on NCT CCs but CoMP operations may be restricted on all NCT CCs except the NCT CC that is designated for "true" CoMP operations (since the Second Alternative supports full-blown CoMP on one CC). For the Third Alternative the above limitation may be placed on all NCT CCs.

Triggering of Aperiodic CSI (A-CSI) Reports

Regarding triggering of CSI reports in CA, a 2-bit trigger may be used in Rel-10 to select which set of CCs to report. 2-bits give 4 combinations: 1 bit may be reserved for no-request and 1 bit may be reserved for reporting the serving cell. The remaining two states are linked to two RRC-configured sets which contain the CCs to be reported when a corresponding trigger is received.

Regarding triggering of CSI reports in CoMP, according to aspects, the 2-bit trigger for selecting CoMP reports may be "reused." Details relating to interpreting the trigger in the case that both CoMP and CA are configured, may be for further study.

According to aspects of the present disclosure, if both CoMP and CA are configured, the concept of "reporting sets" may be reused. Each triggering option resulting from the 2-bit trigger may identify a report set similar to Rel-10. If both CoMP and CA are configured, each reporting set may identify a combination of CCs (for CA reporting) and CoMP CSI reporting configurations (for CoMP reporting). Therefore, when both CA and CoMP are configured, there may be no ambiguity as to which CSI information is to be reported by the UE. The existing 2-bit trigger may also be extended to more than 2-bits to allow for improved flexibility.

In CA, one code point of the 2-bit trigger is reserved for triggering an A-CSI report from the serving cell. For CoMP it is not clear which CoMP CSI reporting configuration this may correspond to, as CSI reports need not necessarily include the serving cell. According to aspects, one approach may be to always trigger the CoMP CSI configuration with a smallest index defined on the serving cell's CC, in place of the actual serving cell. Another approach is to make the behavior dependent on whether the grant triggering the A-CSI report is received on a legacy PDCCH or an ePDCCH.

If the grant triggering the A-CSI report is received on legacy PDCCH, the CoMP CSI configuration with a smallest index defined on the serving cell's CC may be used, in place of the actual serving cell. If the grant triggering the A-CSI report is received on ePDCCH, the UE may report the CoMP CSI feedback configuration that matches the virtual cell ID with which ePDCCH was received. Alternatively, the CoMP CSI feedback configuration corresponding to the PUSCH virtual cell ID may be selected.

Yet another option may be to not support this behavior for CoMP+CA and instead map this code point to a third RRC-configured set that may be used for feedback reporting. The above options may also be used in the case when only a 1-bit (instead of the 2-bit) trigger is present in the grant as specified in 36.213.

In an effort to provide further flexibility, the interpretation of the 2-bit trigger for triggering reports for CoMP+CA may be made CC dependent and/or virtual cell ID dependent. For example, separate RRC-configured sets may be defined per CC. Depending on which CC the A-CSI trigger is received, the sets corresponding to that CC may be used. In another aspect, the RRC-configured sets may be configured per virtual cell ID. Depending on which virtual cell ID is used for the ePDCCH triggering the A-CSI report, the sets corresponding to that virtual cell ID may be used.

According to aspects, different sets may be defined for PDCCH and ePDCCH-based triggering, respectively. For ePDCCH-based triggering, the sets could further depend on the virtual cell ID as discussed above.

In an effort to further increase flexibility, the triggering may be made additionally dependent on the following factors: the type of DCI format that triggers the report, the subframe type (e.g., MBSFN/non-MBSFN) and/or the CSI subframe set on which the trigger is received, and the search space could be partitioned and the sets could be determined in part on which partition of the search space the trigger is decoded.

Periodic CSI Reporting

For both CoMP and CA, periodic feedback reporting may be configured independently per-CC and per-CoMP reporting configuration, respectively. An issue may arise when reports of different feedback instances collide in a specific subframe. A prioritization has been defined in Rel-10 (prioritization done by "reporting-type") for determining which of the reports needs to be dropped (e.g., RI has priority over PMI/CQI, etc.). A similar prioritization procedure may be defined for CoMP.

When both CoMP and CA are configured, existing prioritization procedures may not apply to CoMP and CA individually, but may apply across both CoMP and CA. That is, if a CoMP and a CA feedback reporting instance happen to collide in a certain subframe, then different prioritization rules may be used. Similarly, if new prioritization rules are defined, e.g., in combination with PUCCH Format 3, these rules may also be extended to apply across both CoMP and CA, if configured.

According to aspects of the present disclosure, when both CoMP and CA are configured, if reporting types of the same priority collide in a subframe, both may be reported if their combined payload may be accommodated in the uplink transmission format. If both cannot be accommodated, the prioritization rules may include multiple levels. Prioritizing may occur according to reporting type (e.g., RI, PMI, CQI, according to aspects rules may be reused from Rel-10). Prioritization may occur by CC index or CoMP CSI configuration index. In general, these criteria may be considered in any order.

In one aspect, periodic CSI reporting may be firstly prioritized by reporting type, secondly prioritized by CC index (giving some priority to CA reporting which may be useful to ensure that the network retains the ability to schedule UEs in any of the CCs), and thirdly prioritized by CoMP CSI index.

According to another aspect, the network may configure a bitmap with relative priorities across CCs and CoMP CSI reporting configurations. Reporting types may be considered first. Then, the RRC configured bitmap may be used as tiebreaker. In this way, periodic CSI reports may be prioritized jointly across CCs and CoMP CSI reporting configurations.

According to yet another aspect, if feedback of multiple reporting types in the same subframe is supported (e.g., by using PUCCH format 3), then the payload may be determined in multiple ways. For example, the report may include CSI information corresponding to a single reporting type (e.g., the one with the highest priority among those colliding) and any remaining payload may not be allocated towards lower priority reporting types for which only partial information may fit into the report. Alternatively, the largest possible payload may always be used and may be split among multiple reporting types according to prioritization procedures described above.

UE Capability Signaling

According to aspects, UE capability signaling may be performed jointly for CoMP and CA. For example, capability signaling may need to differentiate between the CoMP+CA options described above in the First, Second, and Third Alternatives.

For the First Alternative, the UE may support a total number of X feedback instances, which may be shared among CoMP+CA. For example, if a UE supports up to 5 feedback instances, it may be configured with up to 3 feedback instances on CC1 and with up to 2 feedback instances on CC2. Alternatively, it may be configured with 4 feedback instances on CC1 but only 1 feedback instances on CC2, etc.

For the Second Alternative, the UE capability may specify a total number of feedback instances supported per-CC. In other words, feedback instances may not be "shared" across CCs.

Bandwidth Dependent UE Capability Signaling

In another aspect, the UE capability signaling may be bandwidth dependent (e.g., per bandwidth combination). This may be important because the complexity associated with computing CSI is approximately proportional to the bandwidth (i.e., a carrier with larger bandwidth requires more complexity than a narrow one). Although this relationship holds only approximately, it suggests that the bandwidth of a CC and the aggregate bandwidth across CCs may be important factors in determining UE complexity.

Figure 14:
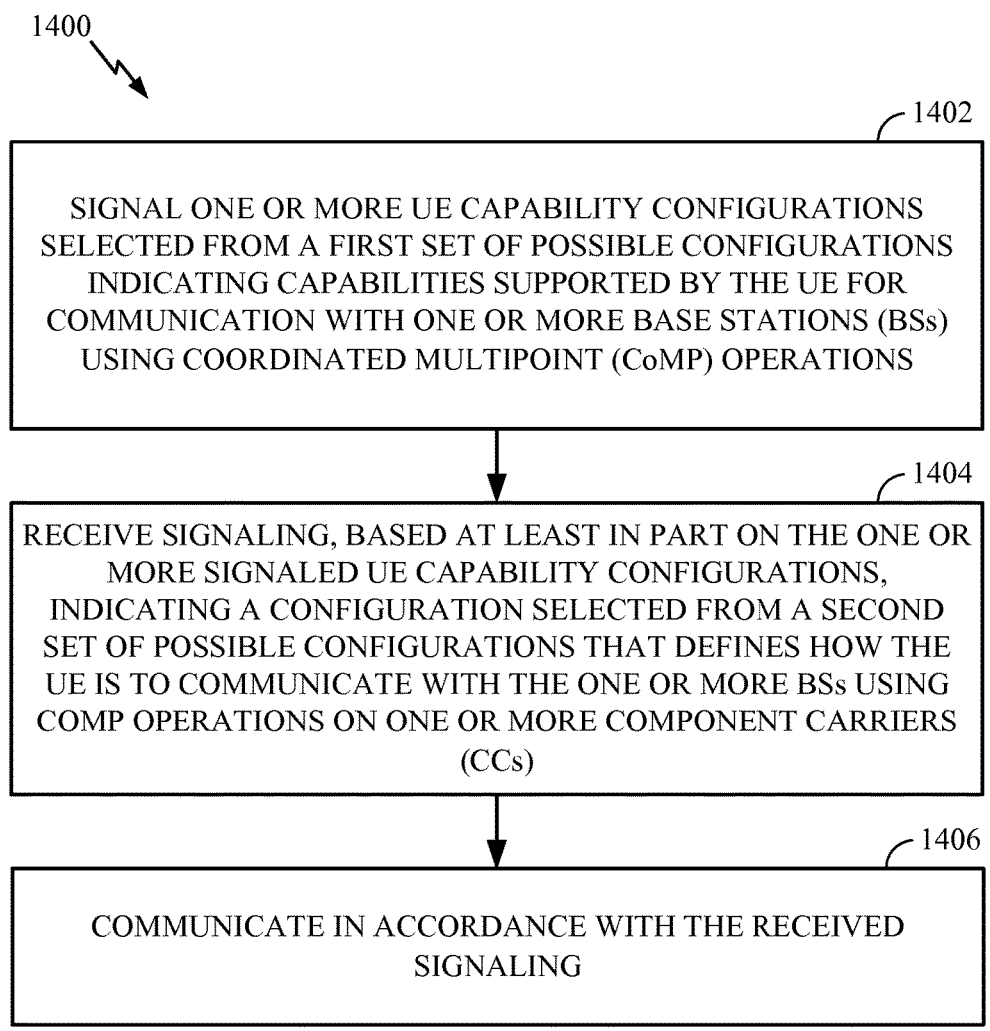
FIG. 14 illustrates example operations that may be performed, for example, by a UE, in accordance with certain aspects of the present disclosure.

FIG. 14 illustrates example operations 1400 that may be performed, for example by a UE (for example, UE 650), in accordance with certain aspects of the present disclosure. At 1402, the UE may signal one or more UE capability configurations selected from a first set of possible configurations indicating capabilities supported by the UE for communication with one or more base stations (BSs) using coordinated multipoint (CoMP) operations. At 1404, the UE may receive signaling, based at least in part on the one or more signaled UE capability configurations, indicating a configuration selected from a second set of possible configurations that defines how the UE is to communicate with the one or more BSs using CoMP operations on one or more component carriers (CCs). At 1406, the UE may communicate in accordance with the received signaling.

As will be described in more detail below, each of the configurations of the first set of possible configurations may indicate a maximum number of CSI processes supported by the UE. The maximum number of CSI processes may limit an aggregate number of CSI processes that can be configured by a network across CCs or the maximum number of CSI processes may limit a number of CSI processes that can be configured for a specific component carrier.

Figure 15:
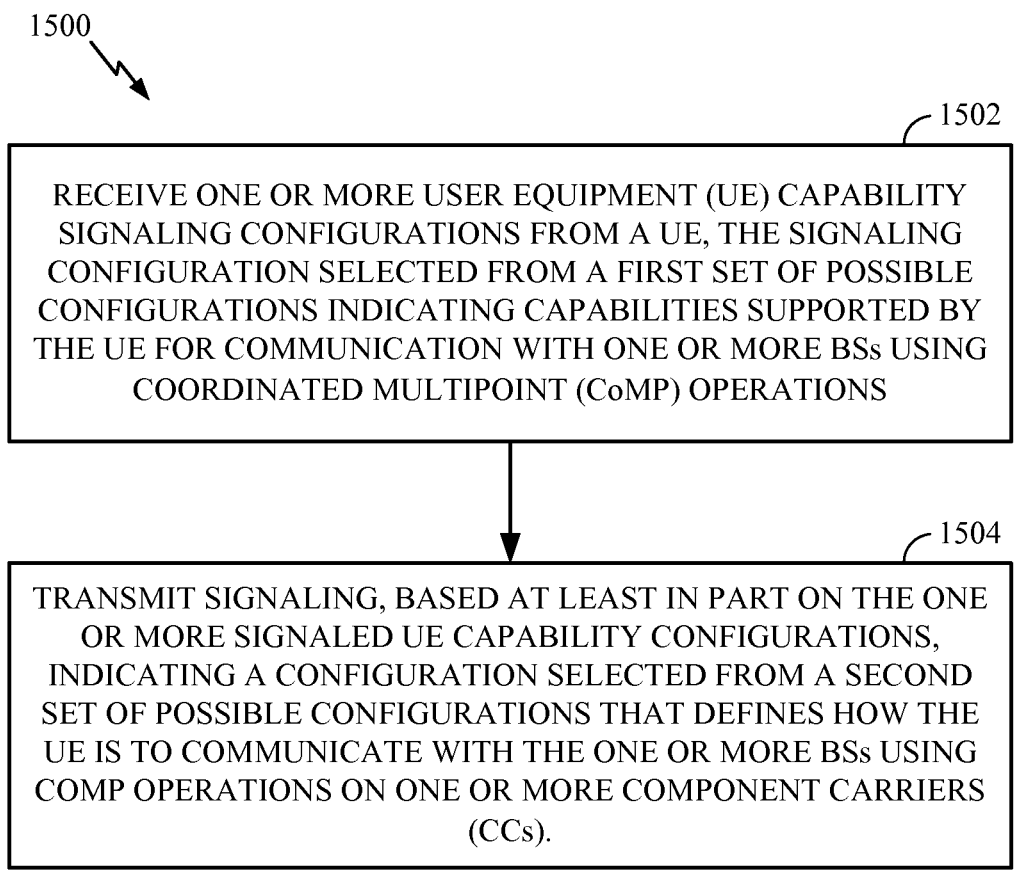
FIG. 15 illustrates example operations that may be performed, for example, by a BS, in accordance with certain aspects of the present disclosure.

FIG. 15 illustrates example operations 1500 that may be performed, for example by a BS (for example, BS 610), in accordance with certain aspects of the present disclosure. At 1502, the BS may receive one or more user equipment (UE) capability signaling configurations from a UE, the signaling configuration selected from a first set of possible configurations indicating capabilities supported by the UE for communication with one or more BSs using coordinated multipoint (CoMP) operations. At 1504, the BS may transmit signaling, based at least in part on the one or more signaled UE capability configurations, indicating a configuration selected from a second set of possible configurations that defines how the UE is to communicate with the one or more BSs using CoMP operations on one or more component carriers (CCs).

As will be described in more detail below, each of the configurations of the first set of possible configurations may indicate a maximum number of CSI processes supported by the UE. According to aspects, the maximum number of CSI processes may limit an aggregate number of CSI processes that can be configured by a network across CCs or the maximum number of CSI processes may limit a number of CSI processes that can be configured for a specific component carrier.

Consequently, in one aspect, the UE capability signaling indicating the number of supported CSI processes could be provided as part of UE capability signaling indicating bandwidth support. For example, for the two CC case, the signaling could indicate for aggregation of two CCs with 10 MHz each, that a first number of CSI processes is supported. However, for an aggregation of 20 MHz+20 MHz a second number of CSI processes would be supported which is presumably smaller than the first number. In this example, the supported number of CSI processes may depend on the aggregate bandwidth.

In yet another aspect, the above signaling may further not only depend on the aggregate bandwidth but also the actual bandwidth combination. For example, the signaling could indicate that an aggregation of two CCs with 10 MHz each may support a first number of CSI processes. However, an aggregation of 5 MHz and 15 MHz may support a second number of CSI processes which may differ from the first number.

In yet another aspect, the number of CSI processes may not be provided as part of the UE capability signaling but instead may be directly incorporated into some specification or provided by some other means. In this case, the UE capability signaling of CoMP+CA may only signal whether or not CoMP+CA operation is supported. Similar to the aforementioned scenarios, this signaling could depend on the aggregate bandwidth or the actual bandwidth combination. For example, a UE may support CoMP+CA for 10 MHz+10 MHz but not for 5 MHz+15 MHz.

Multiple Timing Advanced Groups (TAG) for CoMP+CA

In Rel-10, only a single TAG is supported. Thus, UL transmission timing may be synchronized across all the UL CCs in CA at the UE. In Rel-11, two TAGs are supported, thereby enabling non-synchronous UL transmission timing across CCs in CA.

For CA, it may be sufficient to associate TAGs with different cells (e.g., each TAG comprises a set of cells with uplink resources sharing a timing advance (TA) value).

For CoMP+CA support, it may be beneficial to support TAGs that comprise different virtual cell IDs, for example, to support uplink DPS more flexibly. Accordingly, when a UE transmits with a first virtual cell ID, it may use a first TAG and when it uses a second virtual cell ID, it may use a second configured TAG. Timing advance maintenance mechanisms may remain as in CA on a per TAG basis.

Power Prioritization

Presently, power prioritizations such as PUCCH>PUSCH with uplink control information (UCI)>PUSCH may be used. Further prioritizations may be desired to give priority to uplink CoMP transmissions. If a UE runs into power limitations, it may have to prioritize based on its available power budget. An example power prioritization may be PUCCH>PUSCH with UCI>PUSCH with CoMP>PUSCH without CoMP. Giving priority to CoMP may allow more than one eNB to free up resources if uplink transmission is terminated.

According to another aspect, for uplink sounding, the following prioritization may be desirable, SRS with CoMP>SRS without CoMP. This may be desirable because SRS may provide information to more than one cell if CoMP is configured.

PUSCH Type 2 Hopping

LTE supports PUSCH Type 2 hopping in which a set of cell-specific parameters may determine the specifics of the hopping. The parameters may include the subband parameter $N_{SB}$, the hopping mode (e.g., interSubFrame or intra-SubFrame), as well as the PUSCH hopping offset $N_{RB}^{HO}$. The parameters may be configured on a cell-specific basis.

It may be desirable that individual transmission points may have separately configured hoping parameters. That is, for each transmission point, the set of above parameters may be separately configurable. However, if dynamic switching of uplink transmission points at the UE is targeted, this may force transmission points which support such operations to use the same set of parameters, thereby limiting flexibility.

In an effort to avoid this limitation, the above set of parameters may be tied to virtual cell IDs. In this case, a UE may determine the above set of parameters from the virtual cell ID with which it is dynamically configured. For example, when the UE is configured with a first virtual cell ID, it may use a first set of hopping parameters. When the UE is configured with a second virtual cell ID, it may use a second set of hopping parameters. The map that associats each virtual cell ID with a possibly different parameter set may be signaled through RRC.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication by a user equipment (UE) comprising:
    signaling one or more UE capability configurations selected from a first set of possible configurations indicating capabilities supported by the UE for communication with one or more base stations (BSs) using coordinated multipoint (CoMP) operations;
    receiving signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations; and
    communicating in accordance with the configuration indicated by the received signaling.

2. The method of claim 1, wherein the maximum number of CSI processes limits an aggregate number of CSI processes that can be configured by a network across CCs.

3. The method of claim 1, wherein the maximum number of CSI processes limits a number of CSI processes that can be configured for a specific component carrier.

4. A method for wireless communication by a base station (BS) comprising:
    receiving one or more user equipment (UE) capability signaling configurations from a UE, the signaling configuration selected from a first set of possible configurations indicating capabilities supported by the UE for communication with one or more BSs using coordinated multipoint (CoMP) operations; and
    transmitting signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations.

5. The method of claim 4, wherein the maximum number of CSI processes limits an aggregate number of CSI processes that can be configured by a network across CCs.

6. The method of claim 4, wherein the maximum number of CSI processes limits a number of CSI processes that can be configured for a specific component carrier.

7. An apparatus for wireless communication, comprising:
    means for signaling one or more UE capability configurations selected from a first set of possible configurations indicating capabilities supported by a UE for communication with one or more base stations (BSs) using coordinated multipoint (CoMP) operations;
    means for receiving signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations; and
    means for communicating in accordance with the configuration indicated by the received signaling.

8. The apparatus of claim 7, wherein the maximum number of CSI processes limits an aggregate number of CSI processes that can be configured by a network across CCs.

9. The apparatus of claim 7, wherein the maximum number of CSI processes limits a number of CSI processes that can be configured for a specific component carrier.

10. An apparatus for wireless communication, comprising:
    means for receiving one or more user equipment (UE) capability signaling configurations from a UE, the signaling configuration selected from a first set of possible configurations indicating capabilities supported by the UE for communication with one or more BSs using coordinated multipoint (CoMP) operations; and
    means for transmitting signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations.

11. The apparatus of claim 10, wherein the maximum number of CSI processes limits an aggregate number of CSI processes that can be configured by a network across CCs.

12. The apparatus of claim 10, wherein the maximum number of CSI processes limits a number of CSI processes that can be configured for a specific component carrier.

13. An apparatus for wireless communication by a user equipment (UE) comprising:
    at least one processor configured to:
        signal one or more UE capability configurations selected from a first set of possible configurations indicating capabilities supported by the UE for communication with one or more base stations (BSs) using coordinated multipoint (CoMP) operations;
        receive signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations; and
        communicate in accordance with the configuration indicated by the received signaling; and
    a memory coupled to the at least one processor.

14. An apparatus for wireless communication by a base station (BS) comprising:
    at least one processor configured to:
        receive one or more user equipment (UE) capability signaling configurations from a UE, the signaling configuration selected from a first set of possible configurations indicating capabilities supported by the UE for communication with one or more BSs using coordinated multipoint (CoMP) operations; and
        transmit signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations; and
    a memory coupled to the at least one processor.

15. A non-transitory computer-readable medium for wireless communication by a user equipment (UE), the non-transitory computer-readable medium having code stored thereon, the code executable by one or more processors for:
    signaling one or more UE capability configurations selected from a first set of possible configurations indicating capabilities supported by the UE for communication with one or more base stations (BSs) using coordinated multipoint (CoMP) operations;
    receiving signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations; and communicating in accordance with the configuration indicated by the received signaling.

16. A non-transitory computer-readable medium for wireless communication by a base station (BS), the non-transitory computer-readable medium having code stored thereon, the code executable by one or more processors for:

receiving one or more user equipment (UE) capability signaling configurations from a UE, the signaling configuration selected from a first set of possible configurations indicating capabilities supported by the UE for communication with one or more BSs using coordinated multipoint (CoMP) operations; and transmitting signaling, based at least in part on the one or more signaled UE capability configurations, indicating a configuration selected from a second set of possible configurations that defines how the UE is to communicate with the one or more BSs using CoMP operations on multiple component carriers (CCs) in a carrier aggregated (CA) configuration, wherein each of the configurations of the first set of possible configurations indicates a maximum number of channel state information (CSI) processes supported by the UE on the CCs, and wherein the maximum number of CSI processes supported by the UE on the CCs depends at least on the aggregate bandwidth of the CCs that support CoMP operations.

* * * * *